Figure 1:
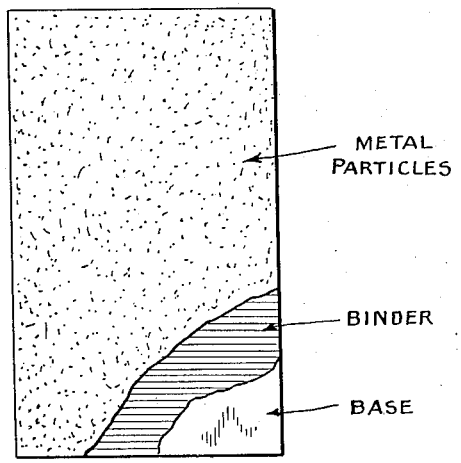

May 26, 1925.

T. ROBINSON 1,539,512

METALLIZED ROOFING MATERIAL

Filed Dec. 11, 1922

Patented May 26, 1925.

1,539,512

UNITED STATES PATENT OFFICE.

THOMAS ROBINSON, OF NEW YORK, N. Y., ASSIGNOR TO ANACONDA SALES COMPANY, A CORPORATION OF DELAWARE.

METALLIZED ROOFING MATERIAL.

Application filed December 11, 1922. Serial No. 606,339.

*To all whom it may concern:*

Be it known that I, THOMAS ROBINSON, a subject of Great Britain, residing at 26 Charlton Street, New York, in the county of New York, State of New York, have invented certain new and useful Improvements in Metallized Roofing Materials; and I do hereby declare the following to be a full, clear, and exact description of the invention, such as will enable others skilled in the art to which it appertains to make and use the same.

This invention relates to composition roofing material, such as impregnated paper and felt, prepared roofing, cut or strip shingles and the like. More particularly, this invention relates to the metallizing of surfaces of nonmetallic materials of this character.

It is the object of this invention to provide roofing materials with improved surfaces and finishes and a process of making such materials.

According to the present invention, the surface of composition roofing materials is metallized by the application of a coat of finely divided metal particles. I have found such surfaces to present many advantages as to both quality and appearance. I prefer to prepare the improved roofing material of my invention by spraying the metallic particles upon the surface to be metallized subsequent to the preparation of the base. I find it advantageous to apply the finely divided particles of metal as a suspension in a liquid vehicle. This mode of preparation gives a substantially uniform and continuous coating efficiently and economically and developes the optimum value of the product.

Roofing prepared according to this invention has many advantages. Structurally, it combines the desirable properties of lightness and strength. The metallized surface is very flexible and is not subject to damage in application under any conditions in which the base is not damaged. The protective coat of metal gives the roofing a very high degree of permanence. This protective coat prevents disintegration of the base due to exposure, provides a film that is unaffected by light and protects the base from the action of light, and inhibits slow oxidation with consequent deterioration of any asphaltic material in the base. The appearance of this roofing is very effective and is a decided improvement over that of any roofing of this type previously known. Due to its metallic character, the original finish is permanent. Likewise a wide variety of finishes are available, by appropriate choice of the metal powder and by subsequent treatment of the roofing after application of the metal powder. For instance, many and varied color effects are possible with copper films. Hitherto, roofing bases, of the character described, have frequently been coated with more or less finely divided slate, to improve both the appearance and the quality of the material. The roofing provided by this invention is, however, very much superior thereto, as the color effects are permanent and do not fade, as the metallized particles are not scoured off by the weather as is the slate, and as the resultant roofing is much lighter in weight.

This invention is applicable to any composition roofing. I find the prepared roofing impregnated with asphalt preferable but the invention can be carried out with material impregnated with any bitumen or bituminous product, such as coal tar and coal tar pitches, animal and vegetable tar and pitches and synthetic resinous products. Likewise the invention may be applied irrespective of the structure or the construction of the impregnated material. This may be any of the known products used for this purpose, such as felts, papers, burlaps or asbestos preparations. The roofing base may be of any suitable structure, laminated or in successive different layers, or coated with other preparations.

Figure 2:
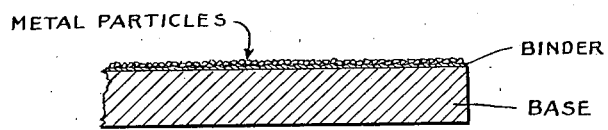

In the accompanying drawings I have illustrated the new roofing in the form of an element similar to a shingle. In these drawings, Fig. 1 is a face view of the material showing parts of the layers broken away to illustrate the construction, and Fig. 2 is a cross-sectional view of the element on an enlarged scale.

These drawings have been provided with appropriate legends which describe the different layers.

The following specific example will serve to illustrate the preferred practice of my invention: I prefer to prepare my improved roofing material by spraying a suspension of finely divided copper in a solution of nitrated cellulose upon an asphalt base roofing felt. I find that from 3 to 7 lbs. of finely divided copper per gallon of spraying solution is suitable. I apply the spraying solution in such proportions that approximately one to two ounces of metal is deposited upon each square foot of material being surfaced.

In the above example I have described a method in which the metal powder is applied directly to the previously prepared roofing material. It will be apparent that many variations are possible within the spirit of my invention. For example, the metal particles may be blown or sprayed directly upon the surface. Where the character of the surface is such that its adhesive properties are improved by slightly elevated temperatures, the base may be warmed just prior to the application of the metallic particles.

The surface of the roofing base may be given any desired configuration prior to the application of the finely divided metal. For instance, it may be corrugated to any desired degree or any desired figures may be embossed thereon.

After the application of the metallic powder to the roofing base, the finish is a dead flat color. To bring out the lustre and characteristic color of the metal used, this surface is preferably burnished or polished. The exposed metallic surface can be treated to obtain any desired color effect. Where the surfacing metal is copper, any of the finishes well known in the art for application to copper can be applied; for example, the roofing may be sprayed with a solution of sal ammoniac after the burnishing operation. Where the metal particles are applied as a suspension in a fluid, which coats the particles with a film, it is of course necessary to burnish, polish or otherwise treat the surface to expose the metal before any finishes that depend upon reaction with the metal can be applied.

After the metallization of the surface, and any subsequent finishing operations that may be desirable, the finished material may be utilized as it is or it may be put into any suitable shape, such as individual or strip shingles.

The choice of metals that may be applied according to this invention is unlimited. The metal should of course be chosen with respect to the conditions to which the roofing will be suitable. In general, cooper, aluminum or bronzes are suitable and by proper choice of the various metal or combinations thereof it is possible to obtain a widely varied range of finishes. In general, a weight of metal of about 1 to 2 ounces per square foot is satisfactory but the weight of the coat applied in metallization can be varied widely, in order to suit the purposes to which the roof is to be applied. It will be apparent that in the case of lighter metals, such as aluminum, a reduced weight of metal is required to obtain an equivalent metallized surface.

In the preferred embodiment of my invention, I utilize solutions of nitrated cellulose as a suspension medium for the finely divided metal, and as a binding medium for the applied metallic particles. Although the cellulose base vehicles are particularly advantageous, many other materials may be used, such as drying oils for example.

It will thus be seen that this invention provides a new class of roofing material principally characterized by a metallized surface of finely divided metal particles, which roofing has many structural advantages and which enables the application of a wide variety of finishes. It will further be seen that this invention provides a process of metallizing the surface of composition roofing materials which yields a very satisfactory product efficiently and economically.

I claim:

1. A roofing material comprising a non-metallic composition base having a coating of finely divided metallic particles bound to the surface of the base by a binding medium having a cellulose base.

2. A roofing material comprising a non-metallic composition base impregnated with a water-resistant material and having one surface coated with finely divided copper bound to the base by a binding vehicle having a cellulose base.

3. A roofing material comprising a non-metallic composition base having a coating of finely divided metallic particles suspended in a vehicle having a cellulose base.

4. A method of preparing roofing material which comprises applying a coating of a binding vehicle of the cellulose ester type to the surface of a non-metallic composition base, and spraying metallic particles over the surface coated with the adhesive to form a substantially continuous layer of metal.

In testimony whereof I affix my signature.

THOMAS ROBINSON.